(12) United States Patent
Ouimet

(10) Patent No.: US 7,711,588 B2
(45) Date of Patent: May 4, 2010

(54) METHOD AND COMPUTER PROGRAM FOR FIELD SPECTRUM OPTIMIZATION

(75) Inventor: Kenneth J. Ouimet, Scottsdale, AZ (US)

(73) Assignee: SAP AG, Walldorf (DE)

( * ) Notice: Subject to any disclaimer, the term of this patent is extended or adjusted under 35 U.S.C. 154(b) by 1875 days.

(21) Appl. No.: 10/735,080

(22) Filed: Dec. 12, 2003

(65) Prior Publication Data

US 2006/0106656 A1    May 18, 2006

Related U.S. Application Data

(60) Provisional application No. 60/459,925, filed on Apr. 3, 2003.

(51) Int. Cl.
 G06F 9/44   (2006.01)
 G06F 17/50  (2006.01)
(52) U.S. Cl. ......................................................... 705/7
(58) Field of Classification Search ........................ None
See application file for complete search history.

(56) References Cited

U.S. PATENT DOCUMENTS

| | | | |
|---|---|---|---|
| 5,083,270 A | | 1/1992 | Gross et al. |
| 5,195,026 A | * | 3/1993 | Nonaka et al. ............... 700/47 |
| 5,195,172 A | * | 3/1993 | Elad et al. ................... 706/62 |
| 5,377,095 A | | 12/1994 | Maeda et al. |
| 5,521,814 A | | 5/1996 | Teran et al. |
| 5,630,070 A | * | 5/1997 | Dietrich et al. ................ 705/8 |
| 5,873,069 A | | 2/1999 | Reuhl et al. |
| 5,946,662 A | | 8/1999 | Ettl et al. |
| 5,953,707 A | | 9/1999 | Huang et al. |
| 5,974,395 A | | 10/1999 | Bellini et al. |
| 6,078,893 A | * | 6/2000 | Ouimet et al. ............... 705/10 |
| 6,308,162 B1 | * | 10/2001 | Ouimet et al. ................ 705/7 |
| 6,366,890 B1 | | 4/2002 | Usrey |
| 6,415,263 B1 | | 7/2002 | Doss |
| 6,456,996 B1 | | 9/2002 | Crawford, Jr. et al. |
| 6,671,673 B1 | * | 12/2003 | Baseman et al. ............... 705/7 |
| 2002/0107819 A1 | * | 8/2002 | Ouimet ....................... 705/400 |
| 2003/0018490 A1 | | 1/2003 | Magers et al. |
| 2003/0023466 A1 | | 1/2003 | Harper |

(Continued)

OTHER PUBLICATIONS

Finn M. Jensen & P.Thoft-Christensen, "Application of Linear Decomposition Technique in Reliability -Based Structural Optimization", 1992, Springer Berlin/Heidelberg, vol. 180/1992.*

(Continued)

*Primary Examiner*—Bradley B Bayat
*Assistant Examiner*—Brandi P Parker
(74) *Attorney, Agent, or Firm*—Meschkow & Gresham, P.L.C.

(57) ABSTRACT

In a planning model, a decision variable optimization process (200) generates a planning function (122) describing the planning model, the planning function (122) depending upon a set of decision variables (125). The planning function (122) is separated into independent planning functions, $SP_i$, each of which depend upon different decision variables (125). Each of the independent planning functions, $SP_i$, is independently optimized to obtain decisions for the different decision variables (125), and an outcome is presented that indicates the decisions. The planning function (122) further includes an embedded constraint function that introduces an embedded constraint to weaken the coupling between decision variables (125) in the planning model, thereby reducing an N-dimensional optimization problem into a lower order optimization problem.

21 Claims, 11 Drawing Sheets

U.S. PATENT DOCUMENTS

2003/0195780 A1    10/2003    Arora et al.

OTHER PUBLICATIONS

Finn M. Jensen & P.Thoft-Christensen article information from search.*

Jensen et al, "Application of Linear Decomposition Technique in Reliability-Based Structural Optimization", 1992, Springer/Berlin, vol. 180/1992.*

* cited by examiner

| STRATEGIC CONSTRAINT SCENARIO IDENTIFIER | FIRST STRATEGIC CONSTRAINT FACTOR VALUE $\lambda_1$ | SECOND STRATEGIC CONSTRAINT FACTOR VALUE $\lambda_2$ |
|---|---|---|
| A | 0 | 0 |
| B | 0 | 0.25 |
| C | 0 | 0.5 |
| D | 0 | 0.75 |
| E | 0 | 1 |
| F | 0.2 | 0 |
| G | 0.2 | 0.25 |
| H | 0.2 | 0.5 |
| I | 0.2 | 0.75 |
| J | 0.2 | 1 |
| K | 0.4 | 0 |
| L | 0.4 | 0.25 |
| M | 0.4 | 0.5 |
| N | 0.4 | 0.75 |
| O | 0.4 | 1 |
| P | 0.6 | 0 |
| Q | 0.6 | 0.25 |
| R | 0.6 | 0.5 |
| S | 0.6 | 0.75 |
| T | 0.6 | 1 |

FIG. 3

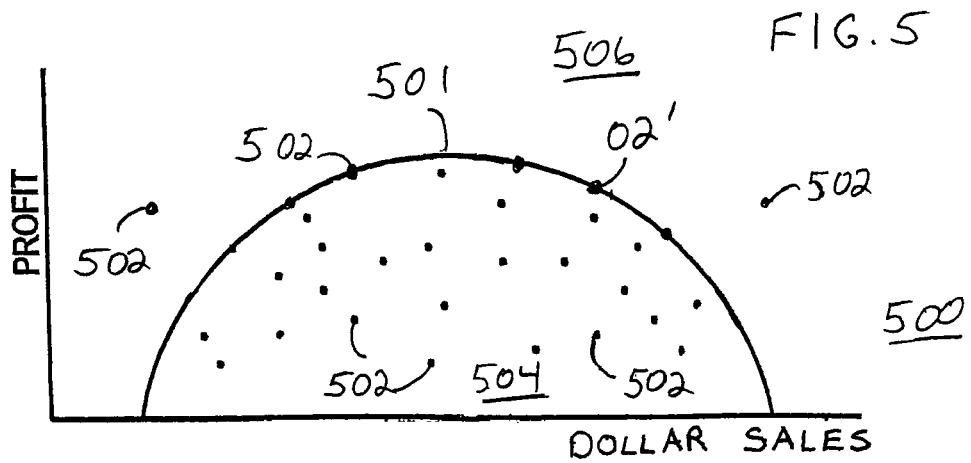
FIG. 5
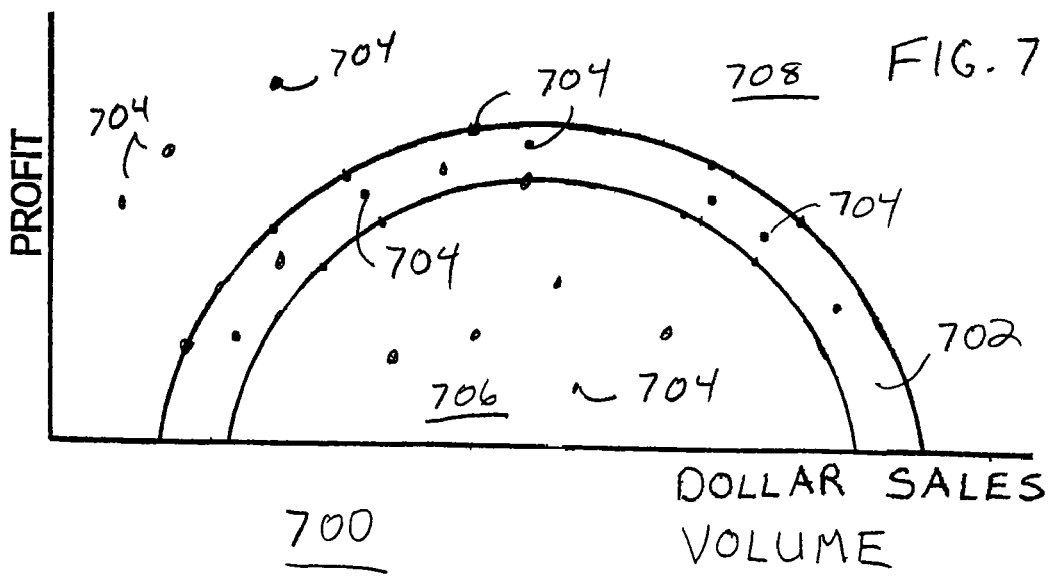
FIG. 6
FIG. 7

| EMBEDDED CONSTRAINT SCENARIO IDENTIFIER | EMBEDDED CONSTRAINT FACTOR VALUE $\gamma$ |
|---|---|
| AA | 0 |
| BB | 0.15 |
| CC | 0.25 |
| DD | 0.35 |
| EE | 0.45 |
| FF | 0.55 |
| GG | 0.65 |
| HH | 0.75 |
| II | 0.8 |
| JJ | 0.85 |
| KK | 1 |
| LL | 1.25 |
| MM | 1.35 |
| NN | 1.45 |
| OO | 1.55 |
| PP | 1.65 |

FIG. 9

| EXAMPLE 1 | |
|---|---|
| PRIMARY OBJECTIVE | GROSS PROFIT |
| STRATEGIC OBJECTIVE | DOLLAR SALES |
| DECISION VARIABLES | PRICES OF ITEMS, $p_i$ |
| TACTICAL CONSTRAINTS | NONE |
| PRIMARY OBJECTIVE FUNCTION | $V(\{p\}) = \sum_i US_i(p_i - c_i)$<br>WHERE<br>$US_i = \exp(q_i^o - \beta_i p_i)$, |
| STRATEGIC OBJECTIVE FUNCTION | $STG(\{p\}) = \sum_i p_i US_i$ |
| PLANNING FUNCTION | $SP(\{p\}) = \sum_i US_i(p_i - c_i) + \lambda \sum_i p_i US_i$ |
| OPTIMIZATION ALGORITHM | CLOSED FORM ANALYTICAL ALGORITM |
| INDEPENDENT PLANNING FUNCTION | $SP_i(p_i) = US_i(p_i - c_i) + \lambda p_i US_i$<br>WHICH YIELDS THE FOLLOWING OPTIMIZATION EQUATION:<br>$p_i^* = c_i + \dfrac{1}{\beta_i} - \dfrac{\lambda}{1+\lambda} \cdot c_i$ |

FIG. 10

| EXAMPLE 2 | |
|---|---|
| PRIMARY OBJECTIVE | GROSS PROFIT |
| STRATEGIC OBJECTIVE | DOLLAR SALES |
| DECISION VARIABLES | PRICES OF ITEMS, $p_i$ |
| TACTICAL CONSTRAINTS | NONE |
| PRIMARY OBJECTIVE FUNCTION | $V(\{p\}) = \sum_i US_i h(p_i)$ |
| STRATEGIC OBJECTIVE FUNCTION | $STG(\{p\}) = \sum_i p_i US_i$ |
| PLANNING FUNCTION | $SP(\{p\}) = \sum_i US_i h(p) + \lambda \sum_i p_i US_i$ |
| OPTIMIZATION ALGORITHM | ONE-DIMENSIONAL OPTIMIZATION ALGORITM |
| INDEPENDENT PLANNING FUNCTION | $SP_i(p_i) = US_i h(p_i) + \lambda p_i US_i$<br><br>WHICH YIELDS THE FOLLOWING OPTIMIZATION EQUATION:<br><br>$SP_i(p_i^*) = \max_{p_i} SP_i(p_i)$ |

FIG. 11

| EXAMPLE 3 | |
|---|---|
| PRIMARY OBJECTIVE | NET PROFIT |
| STRATEGIC OBJECTIVE | DOLLAR SALES |
| DECISION VARIABLES | PRICES OF ITEMS, $p_i$ |
| TACTICAL CONSTRAINTS | $p_i^{min} \leq p_i \leq p_i^{max}$ |
| PRIMARY OBJECTIVE FUNCTION | $V(\{p\}) = \sum_i (US_i h(p_i) - AC_i(1-\delta(x)))$<br>WHERE<br>$x = p_i - p_i^c$ |
| STRATEGIC OBJECTIVE FUNCTION | $STG(\{p\}) = \sum_i p_i US_i$ |
| PLANNING FUNCTION | $SP(\{p\}) = \sum_i (US_i h(p_i) - AC_i(1-\delta(x))) + \lambda \sum_i p_i US_i$ |
| OPTIMIZATION ALGORITHM | ONE-DIMENSIONAL OPTIMIZATION ALGORITM |
| INDEPENDENT PLANNING FUNCTION | $SP_i(\{p_i\}) = US_i h(p_i) - AC_i(1-\delta(x)) + \lambda p_i US_i$<br>WHICH YIELDS THE FOLLOWING OPTIMIZATION EQUATION:<br>$SP_i(p_i^*) = \max_{p_i} SP_i(p_i)$ |

| EXAMPLE 4 | |
|---|---|
| PRIMARY OBJECTIVE | GROSS PROFIT  —1304 |
| STRATEGIC OBJECTIVE | NONE |
| DECISION VARIABLES | PRICES OF ITEMS, $p_i$  —1308 |
| TACTICAL CONSTRAINTS | NONE |
| PRIMARY OBJECTIVE FUNCTION | $V(\{p\}) = \sum_i US_i(p_i - c_i)$,  —1310<br>WHERE<br>$US_i = Dms_i$<br>$ms_i = \dfrac{g_i}{\sum_k g_k}$ |
| EMBEDDED CONSTRAINT FUNCTION | $EMB(\{p\}) = \dfrac{\sum_i g_i}{Z} - 1$  1312<br>ALLOWS A BREAK IN THE COUPLING IN THE MARKET SHARE MODEL BY SETTING<br>$ms_i = \dfrac{g_i}{Z}$<br>WHICH IS EQUIVALENT TO THE MARKET SHARE MODEL WHEN $\sum_k g_k = Z$ OR EMB=0 |
| STRATEGIC OBJECTIVE FUNCTION | NONE |
| PLANNING FUNCTION | $SP(\{p\}) = \sum_i US_i(p_i - c_i) - \gamma \left( \dfrac{\sum_i g_i}{Z} - 1 \right)$ 1318<br>1316 |
| OPTIMIZATION ALGORITHM | ONE-DIMENSIONAL OPTIMIZATION ALGORITM  —1320 |
| INDEPENDENT PLANNING FUNCTION | $SP_i(p_i) = Dg_i(p_i - c_i) - \gamma(g_i)$  1322<br>WHICH YIELDS THE FOLLOWING OPTIMIZATION EQUATION:<br>$SP_i(p_i^*) = \max_{p_i} SP_i(p_i)$  —1324 |

METHOD AND COMPUTER PROGRAM FOR FIELD SPECTRUM OPTIMIZATION

RELATED INVENTION

The present invention claims priority under 35 U.S.C. § 119(e) to: "Enhanced Strategic Planning and Optimization System," U.S. Provisional Patent Application Ser. No. 60/459,925, filed 3 Apr. 2003, which is incorporated by reference herein.

TECHNICAL FIELD OF THE INVENTION

The present invention relates to the field of econometrics. More specifically, the present invention relates to enhanced processes and software for computing decisions for decision variables of a planning model characterizing an enterprise.

BACKGROUND OF THE INVENTION

Enterprise modeling is the process of characterizing a real-world enterprise, using mathematical representations, graphs, and/or pictures. An enterprise planning model often utilizes mathematical modeling techniques to analyze complex real-world scenarios, typically with the goal of improving or optimizing performance. Accordingly, an enterprise planning model can ideally provide insight into past, current, and future operating performance, enabling managers to spot trends, identify opportunities, and affect outcomes.

Multi-dimensional optimization entails determining a set of values that maximizes (or minimizes) a function of many decision variables. The types of mathematical relationships (for example, linear, nonlinear, or discontinuous) between the objective, the constraints, and the decision variables determine how difficult the optimization is to solve. The types of mathematical relationships also determine the solution methods or algorithms that can be used for optimization and the confidence that the solution is truly optimal. Such multi-dimensional optimization is problematic in that there is no known single multi-dimensional optimization strategy that can tackle all problems in a satisfactory way. In addition, the presence of constraints, even of simple ones, enhances this difficulty.

One known strategy for performing multi-dimensional optimization is an exhaustive search method in which an entire configuration space of scenarios (i.e., possible combinations of the variables) is performed to select an optimum out of all possibilities. The exhaustive search method will yield the global optimum. Unfortunately, this method is extremely computationally slow and therefore not applicable in practical situations.

Other strategies entail the iterative gradient search methods. These methods use information of the first and possibly second order derivatives of the criterion function to derive optimal search directions towards the optimum. Gradient search methods guarantee decreasing criterion values in successive iterations. The gradient search methods improve significantly over the exhaustive search method, but are still computationally slow and costly. A further disadvantage of these methods is that they are sensitive to the initial estimates of the unknowns if the criterion function has more than one optimum. As such, the gradient search algorithm may converge to a local optimum instead of the desired global optimum. A global optimum is one in which are no other feasible solutions with better objective function values. In contrast, a local optimum is one in which there are no other feasible solutions "in the vicinity" with better objective function values.

Much attention has been directed toward developing algorithms that circumvent convergence toward a local optimum. Two such algorithms are simulated annealing and genetic algorithms. The simulated annealing technique is essentially a local search, in which a move to an inferior solution is allowed with a probability that decreases as the process progresses. As such, there will always be a chance that a solution with a less good value might be retained in preference to a better solution. Thus, fine tuning of parameter settings is required.

Genetic algorithms are search techniques based on an abstract model of Darwinian evolution. Solutions are represented by fixed length strings over some alphabet ("gene" alphabet). Each string can be thought of as a "chromosome". The value of the solution represents the fitness of the chromosome. Survival of the fittest principle is then applied to create a new generation with slow increase of average fitness. Accordingly, genetic algorithms also have the facility of allowing some weak members to survive in the solution pool, but typically have mechanisms for favoring fitter solutions.

Both simulated annealing and genetic algorithms have a fair chance of circumventing convergence toward a local optimum. In addition, both methods are much faster than the exhaustive search method. However, both methods are still computationally expensive as compared with gradient search methods.

Another problem with conventional optimization algorithms arises when optimizing in the presence of coupled decision variables. As used herein, the term "coupled" refers to decision variables and other objectives within an enterprise planning model that are connected causally to influence one another. This coupling further complicates optimization problems, leading to even more computational expense.

Thus, what is needed is a technique, within an enterprise planning model, that can efficiently and cost effectively solve complex optimization problems.

SUMMARY OF THE INVENTION

Accordingly, it is an advantage of the present invention that a method and computer program are provided for enhanced optimization calculation within a planning model.

It is another advantage of the present invention that a method and computer program are provided for computationally efficient optimization calculation of multi-dimensional planning models.

Another advantage of the present invention is that a method and computer program are provided that mitigate the computational difficulties associated with the coupling between decision variables within the planning model.

The above and other advantages of the present invention are carried out in one form in a planning model characterizing an enterprise, by a method of computing decisions for a set of decision variables. The method calls for generating a planning function representative of the planning model, the planning function depending upon the set of decision variables. The planning function is separated into independent planning functions, each of the independent planning functions depending upon different ones of the set of decision variables. The method further calls for independently optimizing each of the independent planning functions to obtain the decisions for the different ones of the set of decision variables, and presenting an outcome of the optimizing operation, the outcome indicating the obtained decisions.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 3 shows a table of exemplary strategic constraint factor values specified in connection with the execution of the decision variable optimization process;

FIG. 5 shows a graph of an optimum pricing envelope displaying profit (primary objective) versus dollar sales (strategic objective);

FIG. 6 shows an exemplary table of optimized decisions for decision variables of an exemplary scenario computed through the execution of the decision variable optimization process;

FIG. 7 shows a graph of an optimum pricing band displaying profit (primary objective) versus dollar sales (strategic objective) and volume (strategic objective);

FIG. 9 shows a table of exemplary embedded constraint factor values specified in connection with the execution of the embedded constraint subprocess;

FIG. 10 shows a table depicting a first exemplary planning model derived through the execution of the decision variable computation process of FIG. 2;

FIG. 11 shows a table depicting a second exemplary planning model derived through the execution of the decision variable computation process;

FIG. 12 shows a table depicting a third exemplary planning model derived through the execution of the decision variable computation process; and FIG. 13 shows a table depicting a fourth exemplary planning model derived through the execution of the decision variable computation process.

DETAILED DESCRIPTION OF THE PREFERRED EMBODIMENTS

Figure 1:
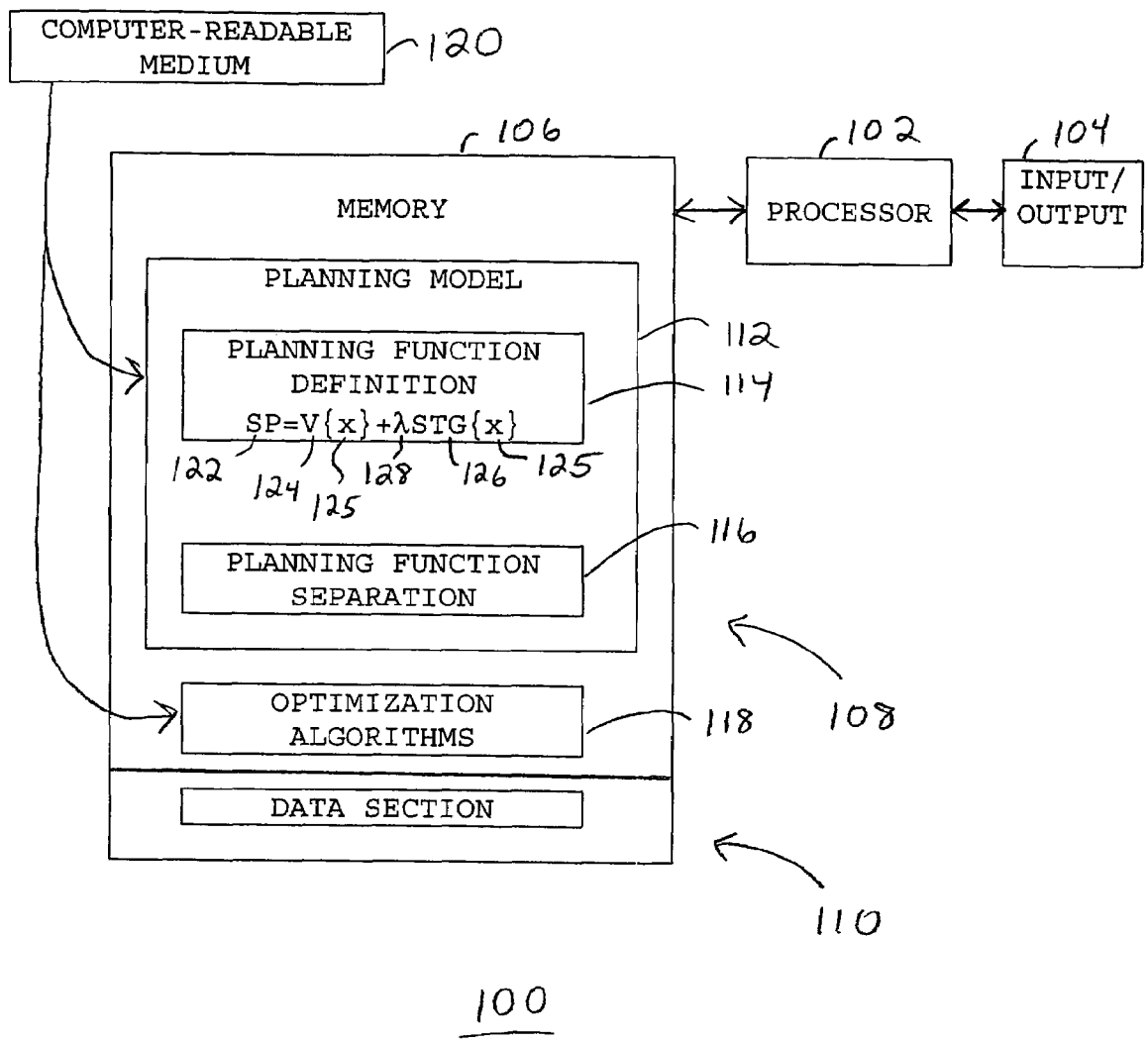
FIG. 1 shows a block diagram of an exemplary computing environment within which the method of the present invention may be practiced.

The following is a glossary of terms used herein:

Enterprise: Any public, private, or governmental organization that provides items to be consumed by others, whether or not for profit. Presumably, an enterprise competes with other enterprises for the attention of customers and potential customers.

Items: Are products in the form of goods, services, or a combination of goods and services. Items are broadly defined so that the same good and/or service provided in different market segments may be considered different items within the present context. Moreover, items are considered to be consumed within the present context when physically and/or legally transferred to the customer, such as when a transaction occurs.

Planning Model: A user-defined characterization of a real-world enterprise.

Planning Function: A mathematical representation of a planning model. The planning function can include of set of related mathematical functions whose purpose is to simulate the response of the enterprise being modeled. The planning function can be linear, consisting of solely linear functions, or nonlinear, involving one or more nonlinear functions. The planning function can include primary objective functions and strategic objective functions.

Primary Objectives: Represent the desires/goals of the decision maker/designer for the enterprise—such as to maximize profit, minimize cost, and so forth.

Primary Objective Function: Is a mathematical equation that represents one of the primary objectives. The primary objective function depends upon a set of decision variables.

Strategic Objectives: Represent factors that the decision maker/designer seeks to consider in conjunction with the primary objectives. The strategic objectives do not represent a physical restriction on the enterprise, thus need not be met rigorously. Strategic objectives include, for example, dollar sales, revenue, price image, service level, risk, product availability, product selection, market share, and so forth.

Strategic Objective Function: Is a mathematical equation that represents one of the strategic objectives. The strategic objective function depends upon a subset of the decision variables.

Decision Variables: Are variables under the control of the decision maker that could have an impact on the solution of the problem of interest. Decision variables include, for example, price, promotion type, promotion date, promotion duration, promotional discount, purchase date, product location, purchasing quantity, shelf space, product assortment, and so forth.

Linear Functions: Contain terms each of which is composed of only a single, continuous variable raised to (and only to) the power of one.

Nonlinear Functions: Are those in which more than a single variable may appear in a single term, and the variables may be raised to any power.

Continuous Functions: Are those in which "small" changes in the input produce "small" changes in the output.

Discontinuous Functions: Are those in which "small" changes in the input can produce abrupt changes in the output.

Those skilled in the art will appreciate that managers of an enterprise desire to understand and achieve the objectives of the enterprise. However, managers typically do not wish merely to achieve a particular primary objective, but may additionally wish to accommodate broader considerations, i.e., the strategic objectives, in conjunction with the primary objectives. The preferred embodiments of the present invention provide a useful tool for computing decisions for a set of decision variables of a planning model. Moreover, the present invention enables the economically efficient computation of decisions, while taking into account the relationship between primary objectives and strategic objectives of an enterprise.

The present invention is designated "field spectrum optimization." The term "field" refers to a Lagrange multiplier that is employed in the present invention as a strategic factor and/or a constraint factor. In other words, the Lagrange multiplier is generally analogous to a "field" as that term may be employed in physics. The term "spectrum" refers to the set of all instances of a given field, i.e., all values for a particular strategic factor or embedded factor. Thus, the field spectrum optimization methodology described herein solves, i.e., optimizes, over the "spectrum" (set of values) defined for a "field" (strategic and/or constraint factor). Moreover, the field spectrum optimization methodology described herein decouples decision variables (discussed below) to further facilitate economically efficient optimization of decisions.

In the following discussion relating to FIGS. 1-12, each Figure's reference numerals are keyed-in to its respective Figure number, i.e., FIG. 1 has reference numerals in the 100's, FIG. 2 has reference numerals in the 200's, and so forth.

FIG. 1

FIG. 1 shows a block diagram of an exemplary computing environment 100 within which the method of the present invention may be practiced. FIG. 1 depicts a processor section 102 in communication with an input/output section 104 and a memory 106. Nothing prevents processor section 102, input/output section 104 and/or memory 106 from including numerous subsections that may or may not be located near each other. Thus, computing environment 100 may be provided by any of a vast number of general or special purpose computers and/or computer networks.

Memory 106 represents any manner of computer-readable media, including both primary memory (e.g., semiconductor devices with higher data transfer rates) and secondary memory (e.g., semiconductor, magnetic, and/or optical storage devices with lower data transfer rates). Input/output section 104 represents any manner of input elements (i.e., a keyboard, mouse, etc.) and output elements (i.e., monitors, printers, etc.). Data and computer programs may be transferred in to or out from memory 106 through input/output section 104.

Memory 106 is depicted as having a code section 108 and a data section 110. Those skilled in the art will appreciate that any distinction between sections 108 and 110 may be due merely to different types of data and need not be due to physically different types of memory devices. Code section 108 stores any number of the types of computer programs typically found on computers and/or computer networks. In addition, code section 108 includes a planning model computer program 112 that may be partitioned into a planning function definition code segment 114 and a planning function separation code segment 116.

Code section 108 also includes optimization algorithm computer programs 118. Optimization algorithm computer programs 118 of code section 108 may include specific optimization algorithms and/or general optimization algorithms. Specific optimization algorithms include, but are not limited to, closed form analytical solution, one-dimensional maximization of continuous decision variables, one-dimensional maximization of discrete decision variables, a general multi-dimensional optimization method, or other user-defined optimization algorithms, known to those skilled in the art. General optimization algorithms include, but are not limited to, ant algorithm, genetic algorithm, tabu algorithm, simulated annealing, branch and bound, and other general optimization algorithms known to those skilled in the art.

Prior to being transferred to memory 106, computer programs 112 or 118 may have resided on a computer-readable medium 120. Computer-readable medium 120 represents any location or storage device from which computer programs may be accessed, including remote servers, CD ROMs, and the like. Computer programs 112 and 118, and code segments 114 and 116 thereof, provide computer software that instructs processor section 102 how to manipulate and process a planning function 122 representative of a planning model of an enterprise, and how to store the resulting solution of planning function 122. Planning function 122 generally includes one or more primary objective functions 124 that depend upon a set of decision variables 125. Planning function 122 optionally includes one or more strategic objective functions 126, each of which is coupled with a strategic constraint factor 128, and each of which also depends upon decision variables 125. Planning function 122 is described in greater detail in connection with FIG. 2.

FIG. 2

Figure 2:
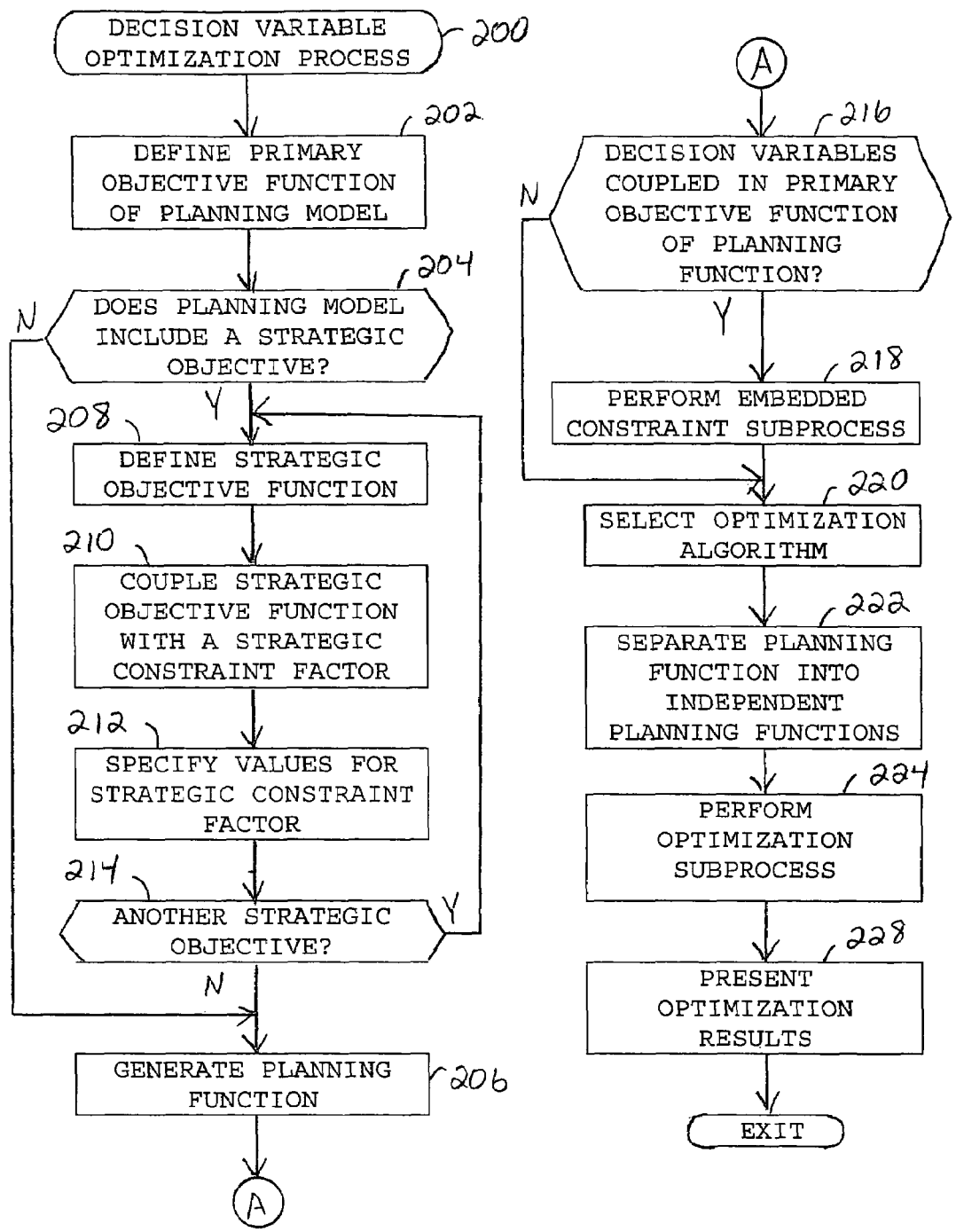
FIG. 2 shows a flow chart of a decision variable optimization process in accordance with a preferred embodiment of the present invention.

FIG. 2 shows a flow chart of a decision variable optimization process 200 in accordance with a preferred embodiment of the present invention. FIG. 2 provides a conceptual vision of the present invention for comprehensiveness of description. However, those skilled in the art will readily recognize that task flow may vary greatly from that which is presented herein in response to actual code instructions of a computer program of the present invention. In addition, it should be understood that tasks described herein may be performed manually by a decision-maker or may be carried out, at least in part, within computing environment 100 by computer programs 112 and 118.

Process 200 facilitates computationally efficient optimization calculation of decision variables 125. In addition, process 200 mitigates the computational difficulties associated with the coupling between decision variables 125 within the planning model. For purposes of the present invention, it is assumed that one or more primary objectives and, optionally, one or more strategic objectives may be incorporated into a planning model characterizing an enterprise.

Decision variable optimization process 200 begins with a task 202. At task 202, primary objective function 124 is defined. More specifically, a primary objective of the enterprise is mathematically modeled through primary objective function 124 at task 202. Primary objective function 124, namely $V\{x\}$, is a function of a set of decision variables 125, namely $\{x\}$. For simplicity of illustration, the present invention is described in connection with a single primary objective function 124. However, the present invention can be readily expanded to include additional primary objectives of the planning model. Consequently, task 202 may further define additional primary objective functions for additional primary objectives of the planning model.

Following task 202, a query task 204 determines whether the planning model includes one or more strategic objectives. When no strategic objective is defined in the planning model, process control proceeds to a task 206 (discussed below). However, when query task 204 determines that the planning model includes a strategic objective, process 200 proceeds to a task 208.

At task 208, strategic objective function 126 is defined. More specifically, a strategic objective of the enterprise is mathematically modeled through strategic objective function 124 at task 208. The strategic objectives represent significant business decisions that may be made by the decision-maker that can affect the primary objective. Strategic objective function 126, namely $STG\{x\}$, is also a function of decision variables 125, namely $\{x\}$.

A task 210, performed in connection with task 208, couples strategic objective function 124 with strategic constraint factor 128, namely $\lambda$. The constant, represented by $\lambda$, is a Lagrange multiplier employed to test the effect that the strategic constraint, modeled by strategic constraint function 126, can have on the planning model. That is, different values for strategic constraint function 126 adjust an influence that the strategic objective will have on the planning model.

In response to task 210, a task 212 specifies values for strategic constraint factor 128. These values can be user-specified or the values may be generated automatically by computing environment 100. The result of task 212 may be a table of values associated with particular scenario identifiers, and will be described in greater detail in connection with FIG. 3.

Following task 212, a query task 214 determines whether the planning model includes another strategic objective. When there is another strategic objective, representing another significant business decision that may be made by the decision-maker that can affect the primary objective, process 200 loops back to task 208 to define a second strategic objective function, couple the second strategic objective function with a second strategic constraint factor, and specify values for the second strategic constraint factor. Subsequent tasks in the flowchart of FIG. 2 shall be discussed herein below, following discussion of FIG. 3.

FIG. 3

FIG. 3 shows a table 300 of exemplary strategic constraint factor values 128 specified in connection with the execution of decision variable optimization process 200. In a hypothetical situation, the planning model includes two strategic objectives. Accordingly, through the execution of process 200, two strategic objective functions 126 are defined. Similarly, values for two strategic constraint factors 128 (i.e., two fields), namely $\lambda_1$, and $\lambda_2$, are specified. In table 300, each of a number of strategic constraint scenarios 302 are given a unique strategic constraint scenario identifier 304. Constraint factor values 306 for a first one of strategic constraint factors 128, $\lambda_1$, are specified as the set (i.e., spectrum) including 0, 0.2, 0.4, and 0.6. Constraint factor values 308 for a second one of strategic constraint factors 128, $\lambda_2$, are specified as the set (i.e., spectrum) including 0, 0.25, 0.5, 0.75, and 1. Strategic constraint scenarios 302 represent every possible combination of constraint factor values 306 and 308. Thus, an exemplary strategic constraint scenario 302', represented by strategic constraint scenario identifier 304 of "G" reveals $\lambda_1=0.2$ and $\lambda_2=0.25$. Optimization (discussed below) will be performed for each of strategic constraint scenarios 302.

FIG. 2 Continued

Referring back to decision variable optimization process 200, when query task 214 determines that there are no further strategic objectives defined within the planning model, process control proceeds to task 206. Similarly, as described above, when query task 204 determines that the planning model does not include strategic objectives, process control proceeds to task 206.

Task 206 combines primary objective function 124 and strategic objective function(s) 126, multiplied by their unique strategic constraint factors 128, to generate planning function 122. The generalized planning function 122 is represented as follows:

$$SP = V(\{x\}) + \sum_{s=1}^{S} \lambda_s STG_s(\{x\}) \tag{1}$$

where "S" is the number of strategic objectives. Equation (1) may also be subject to a set of tactical constraints (not shown). The tactical constraints operate as decision-level constraints with a possible strategic importance. Exemplary tactical constraints include a maximum or a minimum price for an item or class of items, and a defined relationship between prices, for example, the price of item 'n' must be less than or equal to the price of item 'm'. Overall ceilings or floors can also be set for tactical constraints. For example, the system can be constrained so that overall price change is less than a give percentage.

Following task 206, process 200 proceeds to a query task 216. Query task 216 determines whether any of decision variables 125 are coupled in primary objective function 124 of planning function 122. That is, query task 216 determines whether any decision variables 125 in primary objective function 124 are connected causally to influence one another. Examples of coupled decision variables 125 include the effects of competing products and stores; the effects of available demand to different purchasing decisions; spatial and temporal dependencies; the effect of price of a brand to a customer's choice of a brand; and so forth. The determination of coupling between decision variables 125 in primary objective function 124 of planning function further complicates the optimization calculation of decision variables 125.

When query task 216 determines that decision variables 125 are coupled, process 200 proceeds to a task 218. Task 218 causes an embedded constraint subprocess to be performed. The embedded constraint subprocess is described in detail below in connection with FIGS. 8-9. The determination of coupling between decision variables 125 in primary objective function 124 of planning function further complicates the optimization calculation of decision variables 125. As will be discussed below, the embedded constraint subprocess mitigates the computational difficulties associated with this coupling.

Following the execution of the embedded constraint subprocess initiated at task 218, program control proceeds to a task 220. Similarly, when query task 216 determines that decision variables 125 are not coupled, program control also proceeds to task 220. At task 220, an optimization algorithm is selected from the group of optimization algorithm computer programs 118. As discussed above, optimization algorithm computer programs 118 of code section 108 may include specific optimization algorithms and/or general optimization algorithms. The particular optimization algorithm selected will depend upon the structure of planning function 122.

A task 222 is performed in response to task 220. At task 222, planning function 122 is separated into independent planning functions in order to simplify the optimization calculation. In a preferred embodiment, each of the independent planning functions depends upon a different set of decision variables 125. Once separated, these independent planning functions can thus be treated as a sum of independent planning models, one for each item, as follows:

$$SP = \sum_i SP_i(p_i, \lambda) \tag{2}$$

where the independent planning functions are represented by $SP_i$, and each independent planning function for item i (i.e., $SP_i$ depends only upon a set of decision variables 125, represented by $p_i$. It should be understood that the set of decision variables 125 may include one or more of decision variables 125, although the total number of decision variables 125 is less than the total number of decision variables for the planning model represented by planning function 122.

Consequently, a generalized independent planning function can be presented as follows:

$$SP_i(x_i) = \max_{x_i} V_i(\{x_i\}) + \sum_{s=1}^{S} \lambda_s STG_s(\{x_i\}) \quad (3)$$

where "S" is the number of strategic objectives, and the primary objective function, $V_i(x_i)$ is to be maximized for decision variable $(x_i)$. The ability to separate planning function 122 into a number of smaller components, i.e., independent planning functions, for subsequent optimization advantageously enhances the optimization process. Significant savings are realized in terms of required computing time and computing power by reducing a multi-dimensional planning function into lower order independent planning functions.

Following task 222, a task 224 is initiated. Task 224 causes an optimization subprocess to be performed. The optimization subprocess is described in detail below in connection with FIG. 4. The optimization subprocess is performed to optimize a set of decision variables 125 for each of the independent planning functions, $SP_i$, of task 222. Subsequent tasks in the flowchart of FIG. 2 shall be discussed herein below, following discussion of FIG. 4.

FIG. 4

Figure 4:
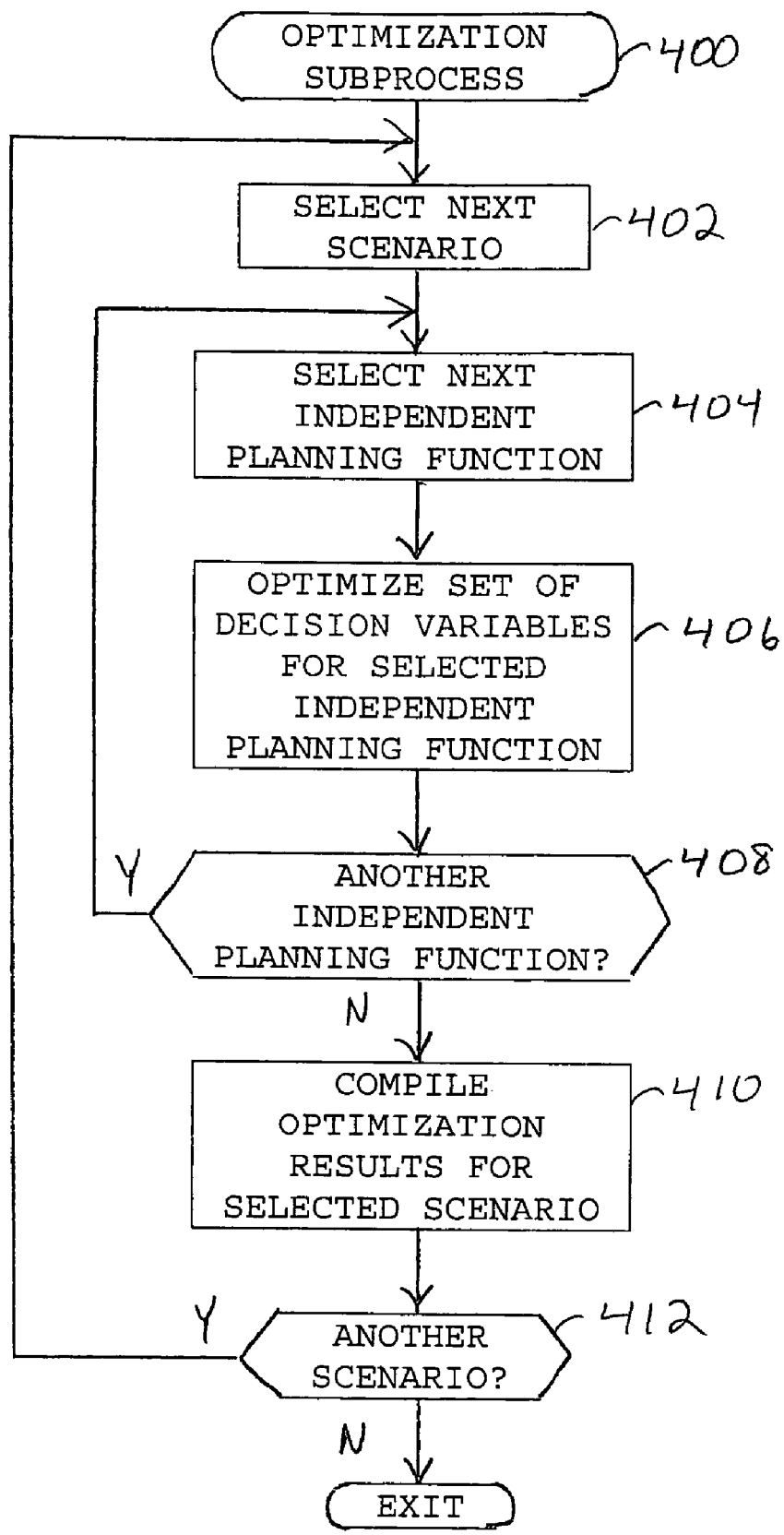
FIG. 4 shows a flow chart of an optimization subprocess in accordance with a preferred embodiment of the present invention.

FIG. 4 shows a flow chart of an optimization subprocess 400 in accordance with a preferred embodiment of the present invention. Optimization entails solving the independent planning function, $SP_i$, to determine an optimum decision or set of decisions for that independent planning function, $SP_i$, at each scenario (for example, at each of strategic constraint scenarios 302). FIG. 4 provides a conceptual vision of the present invention for comprehensiveness of description. However, those skilled in the art will readily recognize that task flow may vary greatly from that which is presented herein in response to actual code instructions of a computer program of the present invention. In addition, tasks described herein may be performed manually by a decision-maker or may be carried out, at least in part, within computing environment 100.

Optimization subprocess 400 begins with a task 402. A task 402 a "next" scenario is selected. For purposes of the present invention strategic constraint scenarios 302 are the scenarios selectable at task 402. It should also be noted that at a first iteration of task 402, the "next" scenario 302 is a first one of the scenarios 302, in this case represented by strategic constraint scenario identifier 304, "A". Thereafter, the term "next" applies.

A task 404 is performed in response to task 402. At task 404, a "next" independent planning function, $SP_i$, is selected. Again is should be noted that at a first iteration of task 404, the "next" independent planning function is a first one of the independent planning functions, $SP_i$, determined at task 222 of decision variable optimization process 200. Thereafter, the term "next" applies.

Following task 404, a task 406 optimizes a set of one or more decision variables 125 for the selected independent planning function, $SP_i$, and the selected scenario 302. Optimization calculations are performed utilizing the optimization algorithm selected at task 220 of decision variable optimization process 200.

Following optimization task 406, a query task 408 is performed to determine whether there is another one independent planning function, $SP_i$, for which optimization is to be performed at the selected scenario. When there is another independent planning function, $SP_i$, program control loops back to task 404 to select the next independent planning function and perform another optimization calculation for the next independent planning function. However, when query task 408 determines that there are no further independent planning functions, $SP_i$, for which optimization is to be performed, optimization process 200 proceeds to a task 410.

Task 410 causes the results of the optimization calculations to be compiled for the selected scenario. As mentioned above, optimization task 406 solves each independent planning function, $SP_i$, to determine an optimum decision or decisions for that independent planning function, $SP_i$, at the selected scenario 302. Furthermore, as discussed above, the independent planning functions, $SP_i$, can be treated as a sum of independent planning models. Accordingly, an outcome of such an iterative approach is a set of optimum decisions, {x*}, for each of decision variables 125 at the selected scenario 302.

Once the optimum decisions {x*} are determined at task 406, metrics that are functions of the optimum decisions can be calculated. These metrics can include, for example, financial metrics corresponding to the primary objective and strategic metrics corresponding to the strategic objective(s). The financial metrics can include, for example, gross profit, net profit, and so forth. The strategic metrics can include, for example, dollar sales, revenue, price image, service level, risk, product availability, product selection, market share, and so forth. Compilation of the results of the optimization calculations may entail storing the results in database form in data section 110 in associated with one of scenario identifiers 304 associated with the selected one of scenarios 302.

Following task 410, a query task 412 is performed to determine whether there is another one of scenarios 302 for which optimization computations are to be performed. When there is another one of scenarios 302, program control loops back to task 402 to select the next one of scenarios 302, and perform optimization calculations for the next one of scenarios 302. However, when query task 412 determines that there are no further scenarios 302 at which optimization is to be performed, optimization subprocess 400 exits.

FIG. 2 Continued

Referring back to decision variable optimization process 200, following the execution of optimization subprocess 400 at task 224, a task 228 is performed. At task 228, an outcome of optimization subprocess 400 is presented to the user via input/output section 104. As mentioned above, optimization subprocess 400 optimizes each independent planning function, $SP_i$, to determine an optimum decision or set of optimum decisions for that independent planning function, $SP_i$, at each scenario (for example, at each of strategic constraint scenarios 302). Furthermore, as discussed above, the optimization results, i.e., the optimum decisions, for all of the independent planning functions, are compiled at task 410, and metrics that are functions of the optimum decisions are calculated. Task 228 presents these metrics to a decision-maker. The metrics can be presented in a number of formats. For example, a textual list of optimized decisions and/or a variety of graphical representations may be displayed. Following task 228, decision variable optimization process exits.

FIG. 5

FIG. 5 shows an exemplary graph 500 of an optimum pricing envelope 501 displaying profit (primary objective) versus dollar sales (strategic objective). That is, graph 500 shows profit versus dollar sales, when decision variables 125 are prices, pi, for items (i.e., goods, services, or a combination of goods and services offered by the enterprise). As discussed above, the independent planning functions can be treated as a sum of independent strategic models. Accordingly, graph 500 represents the sum of the independent planning functions. Graph 500 shows that, starting from a very low dollar sales, profits may increase as the aggregate of prices (decisions for decision variables 125) increases. However, at some point, further increase in the aggregate of prices causes dollar sales to increase, but results in a drop in profit.

When the enterprise offers many different products, a vast number of combinations of different pricing scenarios may be devised. Each pricing scenario represents a different mix of prices that may be offered for a set of products being evaluated. Each scenario is represented by a point 502 in graph 500, of which only a few of all possible pricing scenario points 502 are shown. Only those pricing scenario points 502 on envelope 501 are optimum pricing scenarios. There are two regions of interest in graph 500. Pricing scenario points 502 depicted in a region 504, which reside within or underneath envelope 501, are inefficient. Whereas, pricing scenario points 502 depicted in a region 506, which reside outside envelope 501 are unachievable. By selecting one of pricing scenario points 502 on envelope 501, a user can be presented with the outcome, i.e., a set of optimized decisions for decision variables 125.

Each of pricing scenario points 502 on envelope 501 represents a set of optimized decisions for decision variables 125 at one of strategic constraint scenarios 302. A decision-maker may employ the outcome of the optimization calculations as a guide to determine a preferred strategy, in this case, a preferred pricing strategy, for the enterprise. For example, a decision-maker may elect to sacrifice some profit to gain some amount of dollar sales. If such is the case, the decision-maker may select one of pricing scenario points 502 toward the right side of envelope 501, such as an exemplary pricing scenario point 502'. As readily illustrated in exemplary graph 500, some reduction in profit and a gain in dollar sales may occur. The decision-maker may determine that a short term reduction in profit, with increasing dollar sales, may be strategically important to the long term success of the enterprise.

FIG. 6

FIG. 6 shows an exemplary table 600 of optimized decisions 602 for decision variables 125 of exemplary pricing scenario point 502' computed through the execution of decision variable optimization process 200. Table 600 is illustrated for only one of pricing scenario points 502 for simplicity of illustration. However, it should be understood, that depending upon which strategy (in this case, profit versus dollar sales) that a decision-maker elects, the decision-maker can select any of pricing scenario points 502 along envelope 501. Thus, a decision-maker may highlight any of pricing scenario points 502 along envelope 501 of graph 500, to obtain a set of optimized decisions, such as, prices for items, promotions, and so forth, related to a particular strategic constraint scenario 302.

Table 600 shows a list of items 604, uniquely identified by item identifiers 606, each being associated with one of decisions 602. In this case, the optimized decisions 602 are prices for each of items 604. Table 600 may also include non-price parameters 606 in association with items 604. Non-price parameters 608 may include timing, availability, promotion type, customer type, price thresholds, and other user-specified parameters of interest.

FIG. 7

FIG. 7 shows a graph 700 of an optimum pricing band 702 displaying profit versus dollar sales and volume. In this exemplary situation, two strategic constraints (dollar sales and value) may influence the outcome of the optimization. In such a situation, a general form for planning function 122 may be as follows:

$$SP = V(\{x\}) + \lambda_1 STG_1(\{x\}) + \lambda_2 STG_2(\{x\}) \quad (4)$$

The generalized planning function of equation (4) illustrates an interaction between primary objective function 124 and each of strategic objective functions 126. An optimization for each of strategic constraint scenarios 302 yields a series of optimum curves, each slightly shifted from one another. The result is optimum pricing band 702 of scenario points 704. Like graph 500, scenario points 704 depicted in a region 706, which reside within or underneath band 702, are inefficient. Whereas, scenario points 704 depicted in a region 708, which reside outside band 702 are unachievable. By selecting one of scenario points 704 within band 702, a decision-maker can be presented with the outcome, i.e., a set of optimized decisions for decision variables 125, when two strategic constraints have been considered, i.e., at one of strategic constraint scenarios 302.

FIG. 8

Figure 8:
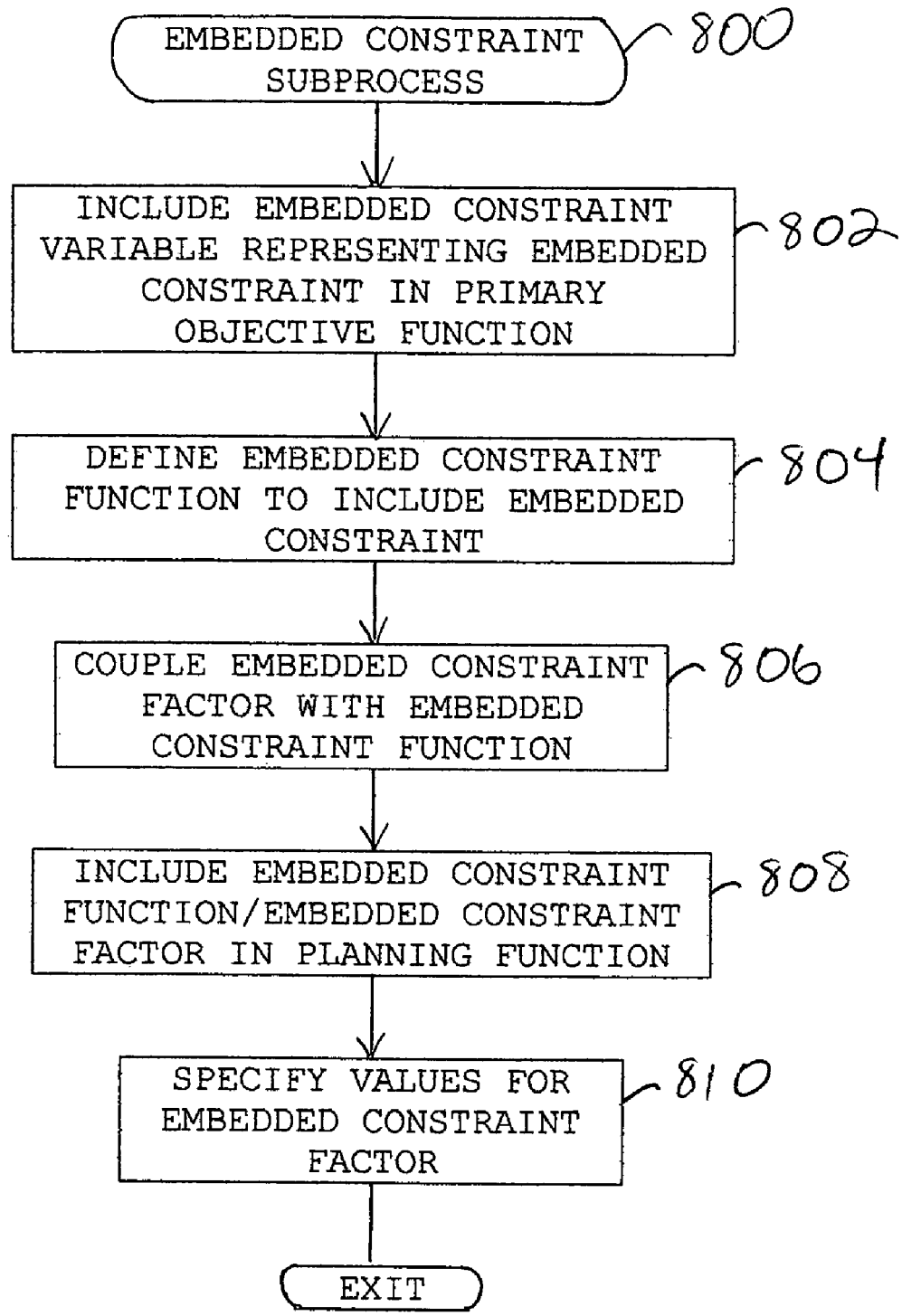
FIG. 8 shows a flow chart of an embedded constraint subprocess of the present invention.

FIG. 8 shows a flow chart of an embedded constraint subprocess 800 of the present invention. FIG. 8 provides a conceptual vision of the present invention for comprehensiveness of description. However, those skilled in the art will readily recognize that task flow may vary greatly from that which is presented herein in response to actual code instructions of a computer program of the present invention. In addition, tasks described herein may be performed manually by a decision-maker or may be carried out, at least in part, within computing environment 100. It should be recalled that when query task 216 of optimization process 200 determines that decision variables 125 are coupled in primary objective function 124, a task 218 initiates embedded constraint process 800.

A generalized primary objective function 124 that includes a coupling between decision variables may be represented as follows:

$$V(\{p\}) = \sum_i \frac{h_i(p_i)g_i(p_i)}{\sum_k g_k(p_k)} \quad (5)$$

The function $h_i$ could be any non-linear function of decision variables 125 for decision i. In this generalized primary objective function 124, the decision variable 125 is the price of an item, and the denominator $\Sigma_k g_k(p_k)$ couples all of decision variables 125 together. Without this coupling, it would be possible to optimize each decision variable 125 independently. However, with this coupling, the optimization becomes more complex. A standard technique for determining the set of prices {p} which would maximize (or minimize) primary objective function 124, V({p}), is to use some general optimization method. If the function is continuous, a gradient search may be employed. If the function is discontinuous, simulated annealing, genetic algorithm, or some other general method may be employed. However, such algorithms are expensive in terms of computational time and expense. Embedded constraint subprocess 800 is performed to reduce or eliminate this coupling of decision variables 125, thus mitigating computational difficulties and expense associated with the coupling between decision variables.

Embedded constraint subprocess 800 begins with a task 802. At task 802, an embedded constraint variable representing an embedded constraint is included in primary objective function 124. Utilizing the exemplary primary objective function 124 of equation (5), the introduction of the embedded constraint variable is as follows:

$$V(\{p\}) = \sum_i \frac{h_i(p_i)g_i(p_i)}{Z} \qquad (6)$$

The embedded constraint variable "Z" is introduced as a new variable to remove the coupling. However, so that the functional form of the original primary objective function 124 remains unchanged, the variable "Z" must satisfy an embedded constraint function.

A task 804, performed in connection with task 802 defines an embedded constraint function. The embedded constraint function is defined to include the embedded constraint variable "Z" as follows:

$$\frac{\sum_k g_k}{Z} - 1 = 0 \qquad (7)$$

Next, a task 806 couples the embedded constraint function with a Lagrange multiplier, i.e., an embedded constraint factor, $\gamma$, and a task 808 includes the embedded constraint function coupled with the embedded constraint factor, $\gamma$, with primary objective function 124 of planning function 122. Thus, primary objective function 124 becomes an effective objective function $\tilde{V}$, as follows:

$$\tilde{V}(\{p\}, Z) = \sum \frac{h_i(p_i)g_i(p_i)}{Z} + \gamma\left(\frac{\sum_k g_k(p_k)}{Z} - 1\right) \qquad (8)$$

As such, the objective function V({p},Z) can be maximized (or minimized) while satisfying its constraint by introducing embedded constraint factor, $\gamma$, and defining an effective primary objective function $\tilde{V}$. This transformation has allowed the coupling between decision variables 125 to be broken. Each optimum p* can now be determined independently by maximizing the following:

$$p_i^*(\gamma):\max (h_i(p_i)g_i(p_i)+\gamma g_i(p_i)) \qquad (9)$$

Following task 808, a task 810 specifies values for the embedded constraint factor, $\gamma$. Embedded constraint factor, $\gamma$, can be determined in a number of ways. If the effective primary objective function is continuous, a gradient method such as Newton's Method could be employed. If the effective primary objective function is discontinuous, a bisection, grid search, or other discontinuous method may be employed. Alternatively, an estimate for the values of $\gamma$ may be determined by setting:

$$\left.\frac{\partial \tilde{V}(\{p\}, Z)}{\partial Z}\right|_{p^*} = 0 \qquad (10)$$

where p* represents a set of optimized decisions (for example, prices), which leads to $$\gamma = \frac{-h_i(p_i^*)g_i(p_i^*)}{\sum_k g_k(p_k)} \qquad (11)$$

Since the optimum decision (such as, optimum prices) are not known, estimates of the optimum decisions can also be used to provide a good estimate of the embedded constraint factor, $\gamma$. The result of task 810 may be a table of values associated with particular scenario identifiers, and will be described in greater detail in connection with FIG. 9.

Following task 810, embedded constraint subprocess 800 exits, and program control returns to task 222 of decision variable optimization process 200. Given the strategic constraint factor $\gamma$, each optimum decision may be readily computed, and given the optimum decision, the original objective function, V({p*($\gamma$)}), can be calculated. Consequently, a multi-dimensional optimization problem can be reduced to a 1-dimensional optimization problem $\tilde{V}(\gamma)$:

$$\tilde{V}(\gamma) = \frac{-h_i(p_i^*)g_i(p_i^*)}{\sum_k g_k(p_i^*)} \qquad (12)$$

FIG. 9

FIG. 9 shows a table 900 of exemplary embedded constraint factor values 902 specified in connection with the execution of the embedded constraint subprocess 800. Through the execution of embedded constraint subprocess 800, an embedded constraint function, represented by equation (7) is defined, and values for an embedded constraint factor 903 (i.e., a field), namely Y, is specified. In table 900, each of a number of embedded constraint scenarios 904 are given a unique embedded constraint scenario identifier 906. Embedded constraint factor values 902 for embedded constraint factor 903 are specified as the set (i.e., spectrum) shown in table 900. Thus, embedded constraint scenarios 904 represent each of embedded constraint factor values 902.

Although not shown herein, it should be understood that a table may be generated that includes both strategic constraint factors 128 and embedded constraint factor 903. In such an instance, the resulting scenarios (not shown) would represent every possible combination of constraint factor values (such as those shown in FIG. 3), and embedded constraint factor values (such as that shown in FIG. 9).

FIGS. 10-13

FIGS. 10-13 provide tables of exemplary planning models and illustrate the enhanced optimization capabilities of the above described processes. The examples described in connection with FIGS. 10-13 are for illustrative purposes only. The present invention may be readily utilized to solve many complex optimization problems by separating multi-dimensional optimization problems into smaller components, as discussed above.

The notation commonly employed in each of the exemplary planning models of FIGS. 10-13 to represent functions, variables, and other parameters, is listed below for clarity of illustration:

V({_})—primary objective function
STG({_})—strategic objective function
EMB({_})—embedded constraint function
SP({_})—planning function, also known as a strategic planning function when strategic objectives are included in the planning model
$SP_i(\{\_\})$—independent planning function
$P_i$—price of item i
$c_i$—cost of item i
$p_i^*$—optimized price of item i
$p_i^c$—current price of item i
λ—Lagrange multiplier utilized as a strategic constraint factor
γ—Lagrange multiplier utilized as an embedded constraint factor
Z—embedded constraint
h(_)—non-linear function
g(_)—function
$US_i$—unit sales of item i
$q_i^o$—demand parameter for a demand model
$β_i$—demand parameter for a demand model
$AC_i$—activity cost for item i
δ(x)—is a generalized function having the value 0 except at 0. In particular, δ(x)=1 if x=0, and δ(x)=0 if x≠0.
D—demand
$ms_i$—market share of item i Those skilled in the art will recognize that the nomenclature can alter greatly from that which is shown herein depending upon the parameters of the particular optimization problem to be solved.

FIG. 10

FIG. 10 shows a table 1000 depicting a first exemplary planning model 1002 derived through the execution of decision variable computation process 200. First exemplary planning model 1002 includes a primary objective 1004, gross profit, and a strategic objective 1006, dollar sales. Decision variables 1008 are defined as being prices of items, i. However, first exemplary planning model 1002 is not limited by tactical constraints.

As shown, a primary objective function 1010 is defined as being a function of the unit sales, $US_i$, of item, i, the price, $p_i$, of item, i, and the cost, $c_i$, of item, i. The unit sales has an exponential dependency on price, as shown, subject to demand parameters of a demand model. A strategic objective function 1012 is revenue or dollar sales, and is defined as being a function of the price, $p_i$, of item, i, and the unit sales, $US_i$. Primary objective function 1010 and strategic objective function 1012, coupled with a strategic constraint factor 1014, are combined to yield a planning function 1016.

A selected optimization algorithm 1018 is a closed form analytical algorithm for independently optimizing each of independent planning functions 1020. More specifically, independent planning functions 1020 yield an optimization equation 1022 that is readily calculated directly to determine an optimum price, $p_i^*$, of item i.

FIG. 11

FIG. 11 shows a table 1100 depicting a second exemplary planning model 1102 derived through the execution of decision variable computation process 200. Second exemplary planning model 1102 represents a non-linear model with continuous decision variables. Accordingly, model 1102 is more complex than model 1002.

Second exemplary planning model 1102 includes a primary objective 1104, gross profit, and a strategic objective 1106, dollar sales. Decision variables 1108 are defined as being prices of items, i. However, second exemplary planning model 1102 is not limited by tactical constraints. As shown, a primary objective function 1110 is defined as being a function of the unit sales, $US_i$, of item, i, the price, $p_i$, of item, i. Moreover, the price, $p_i$, is subject to a non-linear component, i.e., function h. In this example, second exemplary planning model 1102, derived through the execution of process 200, decouples the dependency of the prices.

A strategic objective function 1112 is revenue or dollar sales, and is defined as being a function of the price, $p_i$, of item, i, and the unit sales, $US_i$. Primary objective function 1110 and strategic objective function 1112, coupled with a strategic constraint factor 1114, are combined to yield a planning function 1116.

A selected optimization algorithm 1118 is a one-dimensional optimization algorithm, such as, an exhaustive search, Newton's method, and so forth, for continuous variables for independently optimizing each of independent planning functions 1120. Thus, independent planning functions 1120 yield an optimization equation 1122 that can be computed to determine an optimum price, $p_i^*$, of item i that maximizes the particular one of independent planning functions 1120.

FIG. 12

FIG. 12 shows a table 1200 depicting a third exemplary planning model 1202 derived through the execution of decision variable computation process 200. Third exemplary planning model 1202 represents a non-linear model with discrete decision variables. Accordingly model 1202 is more complex than either of models 1002 and 1102.

Third exemplary planning model 1202 includes a primary objective 1204, net profit, and a strategic objective 1206, dollar sales. Decision variables 1208 are defined as being prices of items, i, and are discrete. Third exemplary planning model 1202 is also subject to tactical constraints 1209. Tactical constraints 1209 require each price, $p_i$, to be within minimum and maximum boundaries for each price.

As shown, a primary objective function 1210 representing net profit is generally defined as being a function of gross profit minus activity costs. In particular, primary objective function 1210 is defined as being a function of the unit sales, $US_i$, of item, i, and the price, $p_i$, of item, i. However, the price, $p_i$, is subject to a non-linear component, i.e., function h. In addition, primary objective function 1210 is affected by activity cost, $AC_i$ associated with changing the price of item i plus the cost of an employee finding the item and changing its shelf price. Through the use of the delta function, δ(x), when there is no change in the price of item i, there is no associated activity cost. However, when the price of item i is adjusted, the activity cost affects the gross profit to yield net profit. A strategic objective function 1212 is revenue or dollar sales, and is defined as being a function of the price, $p_i$, of item, i, and the unit sales, $US_i$.

Primary objective function 1210 and strategic objective function 1212, coupled with a strategic constraint factor 1214, are combined to yield a planning function 1216. Accordingly, planning function 1216 takes into account the cost to implement price changes to determine the net profit.

A selected optimization algorithm 1218 is a one-dimensional optimization algorithm for discrete decision variables for independently optimizing each of independent planning functions 1220. The one-dimensional optimization is performed utilizing a simple search through all acceptable price points, $p^a$, and selecting the price, $p_i^*$, that maximizes independent planning functions 1220 as represented by an optimization equation 1222. As mentioned above, standard routines for solving one-dimensional optimization problems, include, but are not limited to Newton's method, Brent's method, golden section search in one-dimension, and exhaustive search over acceptable boundaries (for example, price points).

FIG. 13

FIG. 13 shows a table 1300 depicting a fourth exemplary planning model 1302 derived through the execution of decision variable computation process 200. Fourth exemplary planning model 1302 is provided to illustrate how process 200 employing embedded constraint subprocess 800 efficiently handle multinomial Logit type models. The present invention advantageously decouples the optimization in a non-linear planning model by introducing an embedded constraint, thereby decoupling the multinomial Logit form into a form, which can be solved analytically or using a one-dimensional optimization method for discontinuous planning models. Although the decoupling of decision variables is illustrated in connection with multinomial Logit type models, embedded constraint subprocess 800 can be readily applied to other types of models.

Fourth exemplary planning model 1302 includes a primary objective 1304, but does not include a strategic objective for simplicity of illustration. However, a strategic objective may be readily incorporated into fourth exemplary planning model 1302, as discussed above. Decision variables 1308 are defined as being prices of items, i. However, fourth exemplary planning model 1302 is not limited by tactical constraints.

As shown, a primary objective function 1310 is defined as being a function of unit sales, $US_i$, of item, i; price, $p_i$ of item, i; and cost, $c_i$, of item, i. However, unit sales is a function of demand, D, and market share, $ms_i$, of item, i. The market share is described by a multinomial Logit model that allocates the available demand to the different purchasing decisions. For instance, market share may describe the customer choice between competing products or stores. The denominator, $\Sigma_k g_k$, within primary objective function 1310 couples decision variables 1308.

In fourth exemplary planning model 1302, the function $g_i$ reflects the exponential dependency of a utility function (not shown) for item i. A utility function could take into account parameters that might influence the sales of item i in a store. These parameters include, for example, whether item i is on a display, whether it has signage, how much shelf space is allocated to the item, coupons, discounts, and so forth.

Through the execution of embedded constraint subprocess 800, an embedded constraint, Z, is introduced into primary objective function 1310. The embedded constraint, Z, replaces the function $\Sigma_k g_k$ in primary objective function 1310. In addition, an embedded constraint function 1312 is utilized to enforce the variable Z. Primary objective function 1310 and embedded constraint function 1312, coupled with an embedded constraint factor, $\gamma$, 1316 are combined to yield a planning function 1318. The inclusion of embedded constraint function 1312 with primary objective function 1310 serves to reduce the coupling between the decision variables of primary objective function 1310. It should be apparent that since no strategic objective is defined in fourth exemplary planning model 1302, it also follows that no strategic objective function is provided in table 1300 for subsequent inclusion in planning function 1318.

In fourth exemplary planning model 1302, a selected one-dimensional optimization algorithm 1320 may be a search algorithm for independently optimizing each of independent planning functions 1322. The one-dimensional optimization algorithm 1320 is performed to select the price, $p_i^*$, that maximizes independent planning functions 1322 as represented by an optimization equation 1324 and satisfies the embedded constraint Z. That is, once values for each embedded constraint factor, $\gamma$, are specified at task 810 of embedded constraint subprocess 800, a suitable value for embedded constraint factor, $\gamma$, is found that maximizes (or minimizes) primary objective function 1310 and concurrently satisfies the embedded constraint Z.

Through the execution of embedded constraint subprocess 800, a coupled N-dimensional, nonlinear optimization problem can be reduced to lower order independent planning functions. A lower order optimization problem yields a significantly shorter processing time and greater stability of the optimization algorithm than prior art algorithms that handle coupled N-dimensional, nonlinear optimization problems.

In summary, the present invention teaches of method and computer program for enhanced optimization calculation within a planning model. The method and computer program produce computationally efficient optimization calculation by separating a multi-dimensional planning model into a set of independent planning models and determining optimal decisions for each of the independent planning models. Moreover, the method and computer program mitigate the computational difficulties associated with the coupling between decision variables within the planning model through the introduction of an embedded constraint.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that the tasks depicted in FIGS. 2, 4, and 8 may be partitioned and sequenced in a wide variety of ways other than those specifically described here.

What is claimed is:

1. In a planning model characterizing an enterprise, a method of computing decisions for a set of decision variables comprising:

generating, in a processing section having one or more processors, a planning function describing said planning model, said planning function depending upon said set of decision variables;

separating, in said processing section, said planning function into independent planning functions, each of said independent planning functions depending upon different ones of said set of decision variables;

independently optimizing each of said independent planning functions in said processing section to obtain said decisions for said different ones of said set of decision variables, wherein said independently optimizing operation comprises selecting an optimization algorithm from a group comprising a closed form solution, a one dimensional maximization of continuous decision variables, a one dimensional maximization of discrete variables, and a general multidimensional method; and controlling said processing section to cause an output section of a computing environment to present an outcome of said optimizing operation, said outcome indicating said obtained decisions.

2. A method as claimed in claim 1 wherein said generating operation defines said planning function to be a non-linear function of at least one of said decision variables.

3. A method as claimed in claim 2 wherein said non-linear function is continuous.

4. A method as claimed in claim 2 wherein said non-linear function is discontinuous.

5. A method as claimed in claim 1 wherein:

said planning model incorporates a primary objective and a strategic objective of said enterprise;

said method further comprises:

defining, in said processing section, a primary objective function describing said primary objective, said primary objective function including said set of decision variables; and defining, in said processing section, a strategic objective function describing said strategic objective, said strategic objective function including a subset of said decision variables; and said generating operation incorporates said primary objective function and said strategic objective function within said planning function.

6. A method as claimed in claim 5 further comprising:

specifying, in said processing section, a plurality of values for a strategic factor, said strategic factor being configured to adjust an influence that said strategic objective has on said planning model; and coupling, in said processing section, said strategic objective function with said strategic factor.

7. A method as claimed in claim 6 wherein said independently optimizing operation optimizes said independent planning functions for each of said values of said strategic factor.

8. A method as claimed in 5 wherein:

said strategic objective is a first strategic objective;

said method further comprises defining, in said processing section, a second strategic objective function describing a second strategic objective of said enterprise, said second strategic objective function including a second subset of said decision variables;

said generating operation further incorporates said second strategic objective function within said planning function; and said presenting operation comprises providing an interaction of said primary objective function, said first strategic objective function, and said second strategic objective function.

9. A method as claimed in claim 8 further comprising:

specifying, in said processing section, a plurality of values for a second strategic factor, said second strategic factor being configured to adjust an influence that said second strategic objective has on said strategic planning model;

coupling, in said processing section, said second strategic objective function with said second strategic factor; and said optimizing operation further includes independently optimizing said planning function for each of said second values of said second strategic factor.

10. A method as claimed in claim 1 wherein said planning model incorporates a primary objective of said enterprise, and said method further comprises:

defining, in said processing section, a primary objective function describing said primary objective, said primary objective function including said set of decision variables, and said generating operation incorporating said primary objective function within said planning function;

determining, in said processing section, a coupling between said decision variables in said primary objective function;

introducing, in said processing section, an embedded constraint into said primary objective function; and following said introducing operation, performing said independently optimizing operation to optimize said primary objective function while concurrently satisfying said embedded constraint.

11. A method as claimed in claim 10 wherein:

said introducing operation comprises:

including an embedded constraint variable for said embedded constraint in said primary objective function; and defining an embedded constraint function to include said embedded constraint variable;

said generating operation comprises constructing said planning function by combining said primary objective function and said embedded constraint function; and said independently optimizing operation comprises providing said decisions which optimize said primary objective function while concurrently satisfying said embedded constraint function.

12. A method as claimed in 11 further comprising:

specifying a plurality of values for a constraint factor, said constraint factor being configured to adjust an influence that said embedded constraint has on said planning model; and coupling said embedded constraint function with said constraint factor.

13. A method as claimed in claim 12 wherein said independently optimizing operation optimizes said independent planning functions for each of said values of said constraint factor.

14. A method as claimed in claim 1 wherein said controlling operation causes said output section to provide said decisions for said different ones of said set of decision variables that optimize said each of said independent planning functions.

15. A method as claimed in claim 1 wherein said controlling operation causes said output section to provide a plurality of scenario points, each of said plurality of scenario points being associated with said decisions for said decision variables that optimize said each of said independent planning functions.

16. A computer-readable storage medium containing code executable by a computer, said code instructing said computer to compute decisions for a set of decision variables of a planning model characterizing an enterprise, said planning model incorporating a primary objective and a strategic objective of said enterprise, and said code instructing said computer to perform operations comprising:

defining a primary objective function describing said primary objective, said primary objective function including said set of decision variables;

defining a strategic objective function describing said strategic objective, said strategic objective function including a subset of said decision variables;

generating a planning function describing said planning model, said generating operation incorporating said primary objective function and said strategic objective function within said planning function, and said planning function including a non-linear function of one of said decision variables;

separating said planning function into independent planning functions, each of said independent planning functions depending upon different ones of said set of decision variables;

independently optimizing each of said independent planning functions in said computer to obtain said decisions for said different ones of said set of decision variables; and presenting an outcome of said optimizing operation at an output section of said computer, said outcome indicating said obtained decisions;

wherein said executable code identifies selection of an optimization algorithm from a group comprising a closed form solution, a one dimensional maximization of continuous decision variables, a one dimensional maximization of discrete variables, and a general multidimensional method.

17. A computer-readable storage medium as claimed in claim 16 wherein said executable code instructs said computer to perform further operations comprising:

specifying a plurality of values for a strategic factor, said strategic factor being configured to adjust an influence that said strategic objective has on said planning model;

coupling said strategic objective function with said strategic factor; and optimizing said independent planning functions for each of said values of said strategic factor.

18. A computer-readable storage medium as claimed in claim 16 wherein said strategic objective is a first strategic objective, and said executable code instructs said computer to perform further operations comprising:

defining a second strategic objective function describing a second strategic objective of said enterprise, said second strategic objective function including a second subset of said decision variables;

incorporating said second strategic objective function within said planning function; and providing an interaction of said primary objective function, said first strategic objective function, and said second strategic objective function.

19. A method of computing decisions for a set of decision variables of a planning model characterizing an enterprise, said planning model incorporating a primary objective of said enterprise, said method comprising:

defining, in a processing section having one or more processors, a primary objective function describing said primary objective, said primary objective function including said set of decision variables;

generating, in said processing section, a planning function describing said planning model, said planning function including said primary objective function, and said planning function depending upon said set of decision variables;

determining, in said processing section, a coupling between said decision variables in said primary objective function;

introducing, in said processing section, an embedded constraint into said primary objective function;

separating, in said processing section, said planning function into independent planning functions, each of said independent planning functions depending upon different ones of said set of decision variables, said independent planning functions including said embedded constraint;

independently optimizing each of said independent planning functions in said processing section to obtain said decisions for said different ones of said set of decision variables, said optimizing operation optimizing said primary objective function while concurrently satisfying said embedded constraint, wherein said independently optimizing operation comprises selecting an optimization algorithm from a group comprising a closed form solution, a one dimensional maximization of continuous decision variables, a one dimensional maximization of discrete variables, and a general multidimensional method; and controlling said processing section to cause an output section of a computing environment to present said decisions for said different ones of said set of decision variables that optimize said each of said independent planning functions.

20. A method as claimed in claim 19 wherein said generating operation defines said planning function to include a non-linear function of at least one of said decision variables.

21. A method as claimed in claim 19 wherein:

said introducing operation comprises:

including an embedded constraint variable for said embedded constraint in said primary objective function; and defining a embedded constraint function to include said embedded constraint variable;

said generating operation comprises constructing said planning function by combining said primary objective function and said embedded constraint function; and said independently optimizing operation comprises providing said decisions which optimize said primary objective function while concurrently satisfying said embedded constraint function.

* * * * *